April 7, 1970 R. E. MARTIN 3,505,194
DESALINIZATION OF CRUDE OIL
Filed Aug. 4, 1967
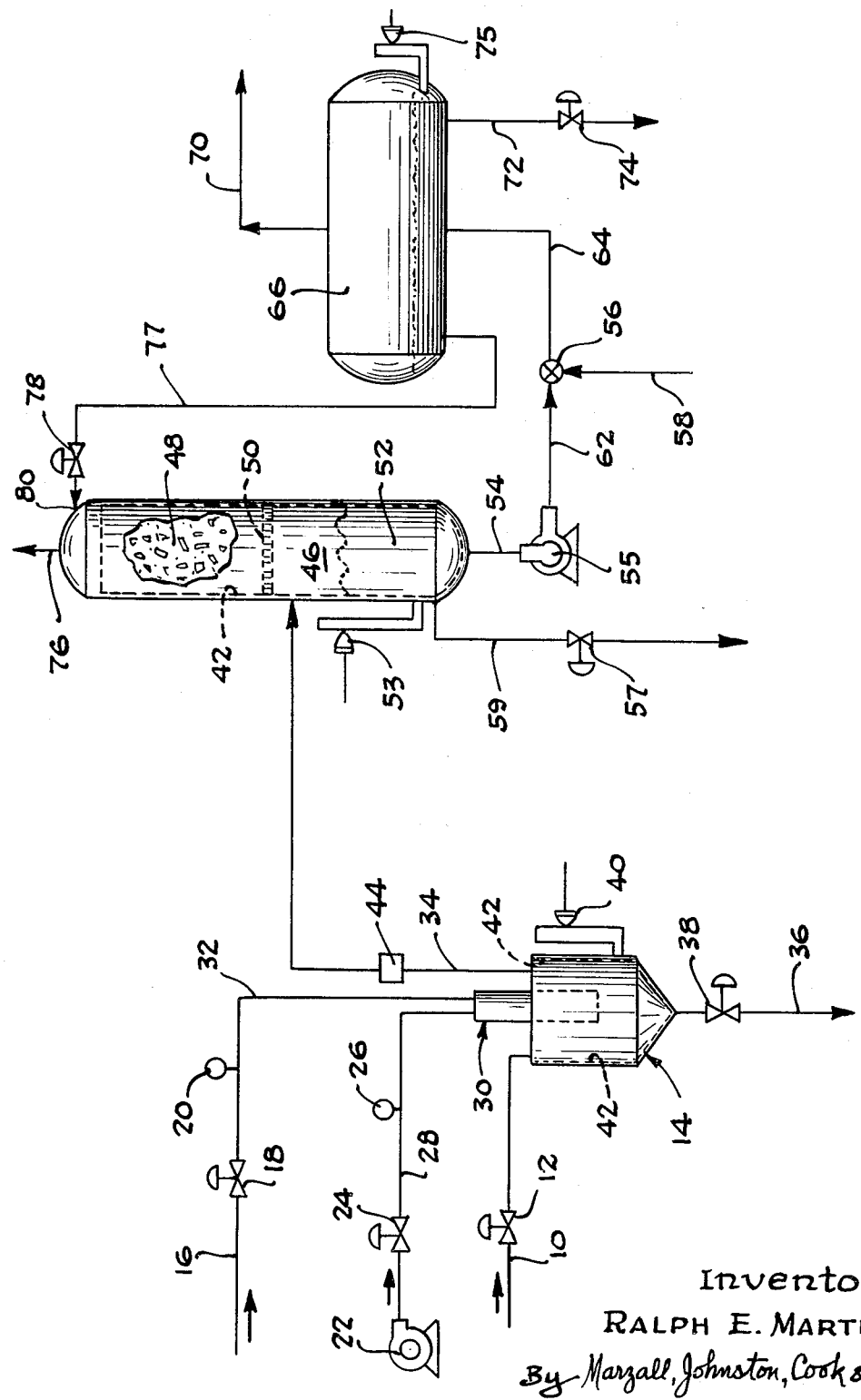
Inventor
RALPH E. MARTIN
By Mazzall, Johnston, Cook & Root
Attorney

United States Patent Office 3,505,194
Patented Apr. 7, 1970

3,505,194
DESALINIZATION OF CRUDE OIL
Ralph E. Martin, Tyler, Tex., assignor, by mesne assignments, to Howe-Baker Engineers, Inc., Tyler, Tex., a corporation of Texas
Filed Aug. 4, 1967, Ser. No. 658,394
Int. Cl. B03c 5/00
U.S. Cl. 204—190                                             4 Claims

ABSTRACT OF THE DISCLOSURE

This invention concerns a process for desalting crude oil. The invention finds welcomed applicability in areas where the water supply which is necessary for desalting operations already contains quantities of inorganic dissolved salt.

The crude oil desalinization is accomplished by first removing dissolved salt from water to be used in the crude oil desalinization. This is accomplished by passing such waters through a series of treatment zones.

Basically, this series of zones comprises a vaporization zone and a condensation zone.

The water being collected in the condensation zone must be held at a temperature of at least 165°F.

The water from the condensation zone is joined with salty crude oil. The salty crude oil is at a lower temperature. As a consequence by way of direct heat transfer, the temperature of the water is lowered and the temperature of the oil is increased. Also, salt being carried by the oil is extracted by the water. The water-crude oil mixture is then separated. Some of the water is returned to the condensing zone to cause condensation of water vapors. The remaining is discarded.

INTRODUCTION

Crude oil received by the refinery may carry large quantities of inorganic salts in suspension. The salt content of some crude oils is shown below.

| Oil field | Gravity API | Pounds per thousand barrels ||||
|---|---|---|---|---|
| | | Chlorides as NaCl | Sulfates as Na$_2$SO$_4$ | Calcium and magnesium as NaCl |
| Oregon Basin, Wyo | 19.9 | 13 | 22.4 | 20.0 |
| East Texas, Tex | 27.9 | 33 | Trace | 16.0 |
| Illinois, Ill | 36.9 | 55 | 8.6 | 30.6 |
| Santa Maria, Calif | 15.5 | 110 | 1.0 | 19.3 |
| Duggan-Slaughter, Tex | 31.8 | 191 | 8.3 | 151 |
| Ventura, Calif | 28.2 | 239 | 22.4 | 56 |
| Vermilion, Canada | 15.2 | 305 | Trace | 84 |
| Ras Charib, Egypt | 18.4 | 1085 | 4.0 | 165 |

Inorganic salts corrode refinery equipment and reduce throughput making their removal desirable. Desalting operations reduce the inorganic salt content to 10–20 percent or less of the original content.

Salts present in the crude oils are the same as those found in the underground water. These salts are predominantly sodium chloride with admixtures of chlorides and sulfates of calcium and magnesium. The salts may be in the anhydrous state or in the form of highly concentrated water solutions. The crude oils as found underground do not contain anhydrous salts. Complete removal of the emulsified water in the field would result in complete desalting of the oil.

Anhydrous salts are formed on evaporation of water from emulsions. The salt crystals become coated with the organic materials and this film protects the crystals from contact with the wash water increasing the difficulty of desalting operations.

The common methods of removing such salts is by electrical dehydration or by employing demulsifying agents such as oxyalkylated triethylene tetramines, oxyalkylated tris(hydroxymethyl) aminomethanes, oxyalkylated glucoses, oxyalkylated pentaerythritols and other similar chemicals.

It would be difficult to adopt any of the methods mentioned above for desalting purposes if no fresh or sufficiently salt-free water is available.

This invention is directed for particular application in areas where the only treatment water available, initially contains salts dissolved therein.

INVENTION

This invention relates to a process for the desalting of crude oils. The invention will find applicability in regions where no fresh or sufficiently salt-free water is available for desalting crude oil. By employing such an invention crude oil can be desalted at 160° F. or below.

The process involves:

(1) The treatment of brackish waters, seawaters, or brine so as to render them substantially free of dissolved solids, thereby producing a finished water.

(2) Using said water to desalt crude petroleum.

The overall process as described utilizes:

(1) Heat sources for vaporizing high dissolved solids water.

(2) A condensing system.

(3) The novel concept of using the salty crude oil as a direct means of heat exchange.

(4) Electric apparatus or chemical agents as previously mentioned for dehydrating petroleum oils.

The four distinct parts of the process shall be discussed in the order presented above.

(1) In a preferred embodiment of the invention the water is heated by direct contact with combustion gases produced by the combustion of hydrocarbons, exemplified by such common fuels as natural gas, propane, diesel fuel oils and residual fuel oils.

While the water may be heated by direct contact with a combustion flame, it is desirable that the flame be contained in an appropriate shield whereby it is insulated from direct contact with the high dissolved solids water.

Based upon the above, it is obvious to those skilled in the art that the invention contemplates using as a heat source for vaporizing the high dissolved solids water a submerged combustion principle. A variety of submerged combustion heaters which apply heat to a liquid by either direct flame contact or by direct contact or by direct contact of the liquid with the hot combustion gases are well known and are commercially available from a number of sources. These devices are easily adaptable whereby they may utilize as a fuel source gaseous or liquid hydrocarbons.

In order to prevent the build-up of dissolved solids in the vaporization zone, the invention contemplates the use of continuous blowdown in conjunction with the concept of maintaining within the vaporization zone a constant volume of high dissolved solids water. In a preferred embodiment, the constant volume of high dissolved solids water is maintained by means of a liquid level controller in conjunction with overflow piping which allows excess overflow to be combined with the blowdown output of the zones.

To further provide safety and efficiency a second readout point in the water level control system is provided, such that the occurrence of an inadequate level of water would actuate signals to a controller so as to reduce fuel input to the submerged burner. As a secondary insurance against the possibility of overheating, a temperature-sensitive reading device is placed in the line connecting the vaporizing zone with the condensing zone. If temperature gets too high in this line, signals from this temperature device will be monitored to a controller in the fuel line. Again, this will actuate the control valve such that input of fuel to the submerged burner will be reduced.

In another preferred embodiment of the invention, mist eliminator means is associated with the vaporization zone to prevent entrainment of high dissolved solids water to the condensing zone.

(2) As also indicated in the Abstract of the Disclosure, the condensing zone is in the form of a vertically positioned condensing column. This condensing column contains at least two sections, with the upper sections being a vapor liquid containing device. A packed section is the preferred vapor liquid contactor. This section contains appropriate packing to provide a large surface area to maximize heat transfer within this section of the column. The packing may be selected from a large number of available packing materials but, preferably, the materials should provide a high capacity, low pressure, drop finished packing. Typical of such packing materials are slot rings, pall rings and flexi-ring packing. Also capable of utilization in forming the packed section of the column are raschig rings and berl saddles.

The lower portion of the condensing zone provides a hot water reservoir which is substantially free of dissolved solids. The temperature of the hot water reservoir is at least 165° F. and is preferably at least between 185° F. and at about the boiling point of the water in the hot water reservoir.

It is important that an adequate temperature differential be maintained between the cooling water at the top of the condensing zone and the water contained in the hot water reservoir in the condensing zone. This temperature differential should be at least 20° and is preferably within the range of 20° to 85°.

The cooling water for utilization in the condensing zone is provided by subjecting a stream from the hot water reservoir to a heat exchange step.

(3) The concept of the heat transfer step consists of contacting the hot water from the condensing column reservoir directly with the crude oil. The oil is heated and the water is cooled by mixing them together to a common temperature.

The temperature of the resulting crude oil-water system is a function of the flow rate volume ratio of water to crude oil. However, the temperature of this system should not exceed 160° F.

Through heat transfer relations and defining the following variables:

(1) Water temperature in reservoir.
(2) Temperature of salty crude oil.
(3) Flow rate of either salty crude oil or of water.
(4) Temperature of crude oil-water system it is possible to calculate in what volume proportion the water and crude oil should be mixed. Whatever conditions exist, the resulting temperature of the crude oil-water system should never exceed 160° F.

While this heat transfer operation is taking place, salts carried by the crude oil are extracted by the water. Also, an emulsion of the oil and water will form.

The outstanding advantage of employing such a step as described in 3 is the cooling of the water which will later be used for condensing the vapors in the condensing column without the use of a heat exchanger.

(4) Formation of the oil water emulsion presents the problem of separation. Separation of this two-component emulsion can be effected by use of an electrical dehydrator or employment of chemical means.

The use of chemicals to separate the crude oil-water is exemplified by U.S. 2,944,985 and similar type patents.

The referred to electrical dehydrator may be exemplified by such a device as described in U.S. 3,252,884.

The electrical dehydrator referred to above works basically on the principle of subjecting an oil-water emulsion to a high voltage electric field. As a result, the dispersed droplets are coalesced and then separated from the oil phase.

This water is then discarded in part. The amount discarded is equivalent to the product of distilled water. The remainder of the water is fed to the top of the condensing column where it causes condensation upon counter-currently contacting the rising water vapors.

As the vapors condense, they collect in a reservoir at the bottom of the column.

Since the cooling water contains dissolved salts, the reservoir water will also contain dissolved salts. However, the concentration of dissolved salts in solution is not enough to effect the removal of salts from the crude oil.

To prevent salt build-up in the reservoir, provisions are made to periodically completely discharge the water in the reservoir.

Upon leaving the reservoir, the water is combined with crude oil containing salt. This combination results in three effects:

(1) Cooling of the water by the oil so as to enable it later to aid condensation in the condensing column.
(2) The extraction of the salts carried in the crude oil by the water.
(3) Formation of an oil-water emulsion.

The present invention is directed to an efficient process of the type that produces a desalted crude oil at a low economical cost. It is capable of design modification to allow it to be constructed at one site and transposed to various areas where it is to be used. The invention utilizes as a heat source any number of hydrocarbon fuels and is particularly efficient and economical when used on the job sites of petroleum drilling and production operations. In such areas hydrocarbon fuel is in plentiful supply and is often needlessly wasted as evidenced by the many waste burners that are commonly used in petroleum production areas to dispose of waste gases.

By having the capability of utilizing a variety of fuels and in the case of smaller units being relatively mobile, the invention lends itself to being extremely versatile.

As will be shown hereinafter, the invention in its physical embodiments features designs which make it relatively maintenance free. One such facet is that evaporation and condensation are by direct contact, heat exchange and consequently scaling and corrosion of heat exchange surface is eliminated. Because of working temperature ranges to which the system will be applied are low, extensive use of thermally stable plastics and metal equipment coated with such plastics may be used to allow for a variety of design adaptations to be employed. Both the evaporator and the condensing column may be plastic lined to eliminate corrosion. Column packing and the mist eliminator may also be plastic. Plastic pipe may be used for all corrosive water service with fiberglass-reinforced pipe being used in most cases.

OBJECTS OF THE INVENTION

The invention provides a long-felt need in the art of desalting crude oils containing relatively large amounts of dissolved solids in areas where sufficient salt-free treatment water is not available. It is capable of design adaptation and fills a long-felt need in the art.

It, therefore, is an object of the invention to provide an improved process for the desalinization of crude oil high in solids.

Another object of the invention is to provide a desalinization process based on thermal principles which utilizes as a heat source submerged combustion gases.

A further object of the invention is to provide a desalinization process which is relatively maintenance-free and which is capable of producing desalted crude oil.

A further object of the invention is to utilize the actual crude oil in preference to a type of heat exchanger in reducing the temperature of the water required to condense water vapors.

A still further object of the invention is to provide a unitary process of desalting crude oil in the form of several zones which are interrelated and dependent, one upon the other, whereby a process equilibrium condition is rapidly established and maintained.

Other objects will appear hereinafter.

THE DRAWING

While the invention has been specifically described from a process standpoint, it may be more readily understood with reference to the drawing which is schematic, broken away in part, view of a typical embodiment of the invention, simplified in nature to more readily understand the process. The drawing shows the vaporization zone using a submerged combustion heater, the condensation zone as a vertical positioned, partially packed condensing column, and the crude oil water dehydrator as an electric emulsion breaker.

The drawing represents the process system which is typical of that described by the invention.

With specific reference to the drawing, there is shown a vaporizer 14 which is in the form of a vertical reaction vessel. The vaporizer is fitted at its top with a submerged combustion device 30 which is connected by means of suitable lines 28 and 32 to an air supply such as blower 22 and a fuel source (not shown), respectively. Fuel line 16 and air line 28 are each fitted with safety pressure switches 20 and 26, respectively.

Near the top of the vaporizer 14 is fitted an inlet line 10 which supplies to the vaporizer the high dissolved solids water to be treated. Water supply line 10 may be fitted with a flow control regulating valve 12. This valve helps maintain within the vaporizer 14 a constant volume of high dissolved solids water. The vaporizer 14 is fitted with a liquid level controller 40, in which is incorporated a blowdown valve 38 which is positioned at the bottom of the vaporizer 14. By regulating liquid level controller 40 and flow control regulator 12 in conjunction with the proper setting of blowdown valve 38, which allows for emission of water through line 36, it is possible to carefully maintain a constant volume of high dissolved solids water in the vaporizer 14 without substantially increasing tthe salt content to the point where excessive scale build-up occurs.

In air line 28 there is flow control valve 24 which may be varied as a function of fuel input so as to control air input to the system.

Also, as an added safety device, a flow control valve 18, in fuel feed line 16, is incorporated into liquid level controller 40 so that if the level of the water in evaporator 14 reaches an inadequate level, signals from known electrical sensing devices and wiring not shown will be conveyed to the control valve 18 in the fuel line system, causing a reduction in fuel input to the system. Similar provision may be made in transmission line 34 so that control valve 18 may be actuated so as to decrease fuel input if temperature gets too high in this line. The reason for this is obvious. If the liquid level were to drop to a low or inadequate point and the input of the fuel to the submerged burner 30 would remain the same as that for a full system, there would be an over-abundant supply of heat generated. This excess heat would be dangerous.

To further improve the operational efficiency of the vaporizer 14, it is desirable that its inner walls and bottom be lined with a thermally stable, smooth surfaced, heat-resistant plastic 42. This coating may be prepared from a variety of synthetic materials such as Teflon (polytetrafluoroethylene), high density polypropylene or fiberglass-reinforced polyester or epoxy resins. These surfaces prevent the accumulation of difficultly removable scale while, at the same time providing a substantially corrosion resistant vaporizer.

The submerged combustion device 30 is preferably of the flame enclosed type which allows only the hot combustion gases to directly contact the aqueous liquid in the vaporizer 14. Since the water temperature in the vaporizer is only under a slight pressure, the temperature of the water rarely is in excess of 200° F. At this temperature the plastic coated walls 42 are immune to heat deformation, thereby rendering them capable of providing a long life, maintenance-free vessel.

As the water in vaporizer 14 is elevated to about its boiling point, there is produced a gaseous mixture which comprises combustion gases which are saturated with water vapors. These vapors are transferred from vaporizer 14 through vapor transmission line 34 into a condensing column 46. To minimize water droplets from being carried with the water-saturated gas vapors, a mist eliminator of known design 44 may be placed in vapor transmission line 34 at a point just above the vaporizer 14.

The gases containing the water vapors pass upwardly through the column 46 into packing 48, which is supported by a horizontally mounted perforated tray 50. The packing is lower in temperature than the temperature of the water entrained in the combustion gases. As a result of contacting the cooled packing 48, the water vapors are condensed and pass downwardly to a hot water reservoir section 52 located at the bottom of column 46. The combustion gases pass upwardly through column 46 and are vented to the atmosphere through vent line 76. To provide chilled water, water in the hot water reservoir is withdrawn therefrom through line 54 and, by means of pump 55 and line 62 is transmitted to a junction where it combines with salty crude oil from line 58.

The salty crude oil is at a lower temperature than the hot water. As a result, direct heat transfer will take place between the two. Consequently, the crude oil temperature increases and the hot water temperature decreases.

It is part of this cooled water which is used to condense water vapors in the condensing column.

The water and salty crude oil combine and form an emulsion. Salts carried by the crude oil are extracted therefrom by the water. The crude oil-water emulsion travels through line 64 to electrical dehydrator 66. The desalted crude oil and the water carrying dissolved salts are separated in this electric emulsion breaker.

The desalted crude oil is discharged by way of line 70.

Part of the water from the electric dehydrator is transmitted through line 77 where it is returned continuously to point 80 in the condensing column 46 above the packing 48. To enable balancing the system, line 77 is provided with a flow control regulating valve 78.

The bottom of condensing column 46 and the section thereof comprising the hot water reservoir 52, is further fitted with a liquid level controller 53 having incorporated therein control valve 57. Water will be discharged through line 59 if the liquid level in the reservoir reaches a point greater than that set on the level controller 53.

Said liquid level controller may be conventional design.

Valve 57 has the added function of periodically discharging the contents of the reservoir so as to prevent solids build-up therein.

The remaining water in the electric emulsion breaker 66 is discharged through line 72. The volume of this water discharged is equivalent to the production of distilled water. The volume discharge of water is defined by setting liquid level controller 75 having incorporated therein control valve 74 to the desired level.

An important concept of the invention resides in the maintenance of the temperature differential between the hot water in the hot water reservoir 52 and the inlet water temperature entering through inlet 80 by at least 20° and preferably about 80–85° F.

It is also an important concept of the invention that water equivalent to the production of distilled water is drawn off the electric dehydrator.

The major units shown in the drawing such as line 34 in column 46 are plastic or plastic lined, as is vaporizer 14. In a preferred embodiment of the invention all of the piping is also plastic or plastic lined.

The packing 48 in column 46 should be of such a nature so as to provide high capacity and low pressure drop. As indicated, the packing should be preferably slot rings, pall rings and flexi-ring packing types. Also capable of utilization in forming the packed section of the column are raschig rings and berl saddles.

The criticality of the water temperature of the water entering the condensing column at point 80 is illustrated by the fact that when this temperature is 160° F., 25% of the water vapors in the combustion gases are lost through vent 76.

Usually the equilibrium temperature is approximately the average temperature of the two temperature differentials and is attained at a point at about the bottom of packing 48.

It should be noted that the use of packing 48 for condensing the water by way of direct heat transfer is an important feature contributing to the success of the invention. This packing provides a maximum heat transfer surface far superior to other cooling type heat exchange devices. Since the vapors contacting the packing are carried by hot combustion gases, conventional heat exchange surfaces give very low heat transfer rates due to the noncondensables present. If a conventional heat exchanger was used to condense the water, the product water would be saturated with combustion gases at the lowest temperature reached and would be corrosive.

CONCLUSION

The thus described processing apparatus are capable of furnishing desalted crude oil. The invention is capable of being designed from an equipment standpoint to treat large or small quantities of salty crude oil. In cases where only small volumes of salty crude oil are to be desalted by the practices of the invention, it is possible to prefabricate much of the equipment shown in the drawings at one site and to then transport it to the sites where it is to be used. The versatility of the process is characterized by its ability to utilize as a fuel source a large variety of hydrocarbons and to readily desalt salty crude oils.

An important contribution of the invention resides in the maintenance of constant volume high dissolved solids water in the vaporizer 10 which tends to minimize the build-up of scale in this vessel, thereby eliminating to a great degree a troublesome problem encountered in evaporative type schemes which may be proposed for the desalinization of the water which is to be used.

Having thus described my invention, I claim:

1. A process for the desalinization of crude oil where the water supply available to be used in the desalinization of the crude oil contains large amounts of dissolved salts, said process comprising the steps of heating a constant volume of high dissolved solids water in a vaporizing zone by contacting said water with hot combustion gases to cause vaporization of the water, transferring the thus produced vapors to a condensing zone which comprises a vertical condensing column having within its upper section packing and in its bottom section a hot water reservoir whose average temperature is at least 165° F., counter-currently contacting the vapors from the vaporization zone with droplets of cooled water in the packed section of the column to produce, by condensation, hot water in the hot water reservoir, withdrawing a constant volume of hot water from the hot water reservoir and passing it in direct heat exchange relationship with a salty crude oil whose temperature is lower than the temperature of the hot water whereby the temperature of the hot water is reduced and contains salts extracted from the crude oil, separating the cooled water from the desalted crude oil, drawing off an amount of water equivalent to the production of distilled water and then returning the remaining cooled water into the top of the condensing column.

2. A process for the desalinization of crude oil for areas where the water supply available to be used in the desalinization of the crude oil already contains large amounts of dissolved salts, said process comprising the steps of heating a constant volume of high dissolved solids water in a vaporizing zone by contacting said water with hot combustion gases to cause vaporization of the water, transferring the thus produced vapors to a condensing zone which comprises a vertical condensing column having within its upper section packing and in its bottom section a hot water reservoir whose average temperature is at least 165° F., countercurrently contacting the vapors from the vaporization zone with droplets of cooled water in the packed section of the column to produce, by condensation, hot water in the hot water reservoir, withdrawing a constant volume of hot water from the hot water reservoir and passing it in direct heat exchange relationship with a salty crude oil of lower temperature, with the volume of such water in proportion to the volume of oil being determined by heat transfer relationships such that the temperature of the water-oil mixture never exceeds 160° F., said cooled water containing salts extracted from the crude oil, separating the cooled water from the desalted crude oil, drawing off an amount of water equivalent to the production of distilled water and then returning the remaining water into the top of the condensing column.

3. The process of claim 1 whereby the method of separating the crude oil from the salty water is by electrical dehydration.

4. A process for the desalinization of crude oil in areas where the water supply available to be used in the desalinization of the crude oil already contains large amounts of dissolved salts, said process comprising the steps of heating a constant volume of high dissolved solids water in a vaporizing zone by contacting said water with hot combustion gases to cause vaporization of the water, transferring the thus produced vapors to a condensing zone which comprises a vertical condensing column having within its upper section packing and in its bottom section a hot water reservoir whose average temperature is at least 165° F., counter-currently contacting the vapors from the vaporization zone with droplets of cooled water in the packed section of the column to produce, by condensation, hot water in the hot water reservoir, a liquid level controller to allow complete discharge of the hot water in the hot water reservoir to prevent build of dissolved salts therein, withdrawing a constant volume of hot water from the hot water reservoir and passing it in direct heat exchange relationship with a salty crude oil whose temperature is lower than the temperature of the hot water whereby the temperature of the hot water is reduced and contains salts extracted from the crude oil, separating the cooled water from the desalted crude oil, withdrawing an amount of water equivalent to the production of distilled water and then returning the remaining water to the top of the condensing column.

References Cited

UNITED STATES PATENTS 2,182,145  12/1939  Eddy _____ 204—308
2,355,678  8/1944  Roberts _____ 204—190

OTHER REFERENCES

Extraction of Salts from Refinery Stocks by the Electrical Process, October 1937, Refiner & Natural Gasoline Manufacturer, vol. 16, No. 10.

Removal of Inorganic Salts From Petroleum, The Oil and Gas Journal, Apr. 4, 1940, pp. 52, 54 and 55.

JOHN H. MACK, Primary Examiner

T. TUFARIELLO, Assistant Examiner